3,014,515
FOOD PROCESSING MACHINE
David A. Meeker and Richard S. Hartley, Troy, Ohio, assignors to The Hobart Manufacturing Company, Troy, Ohio, a corporation of Ohio
Filed Mar. 13, 1959, Ser. No. 799,241
3 Claims. (Cl. 146—182)

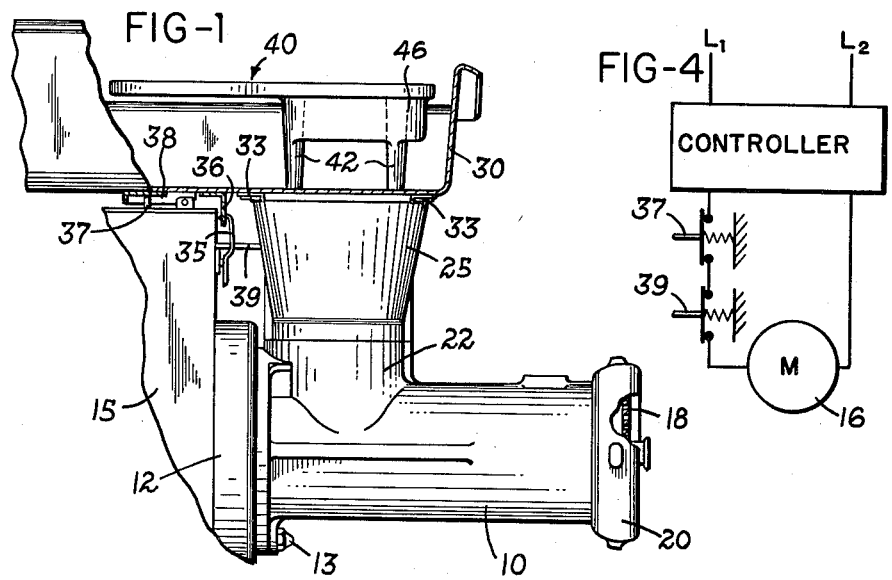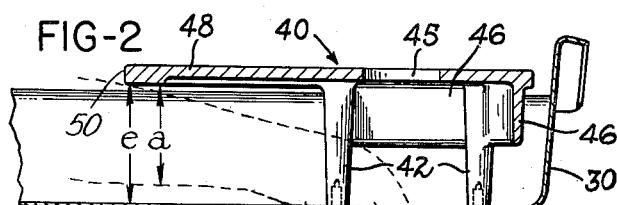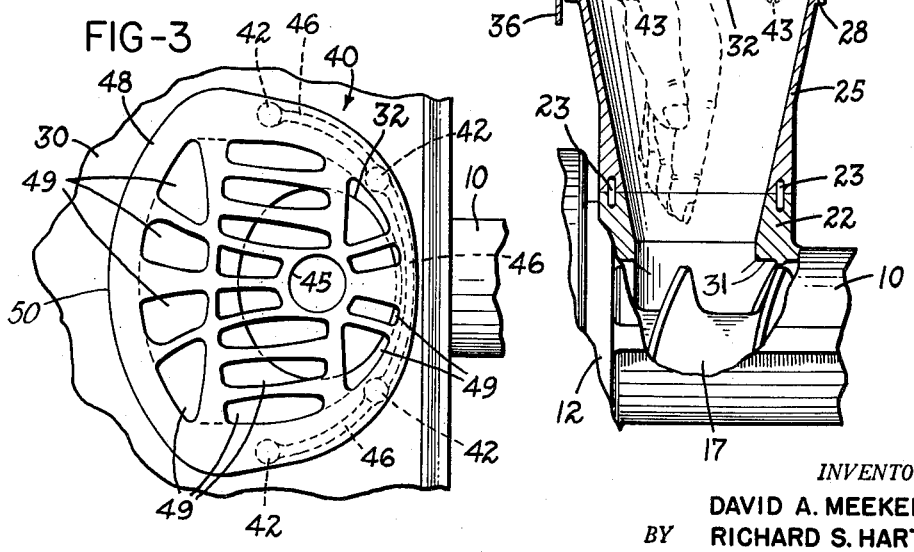

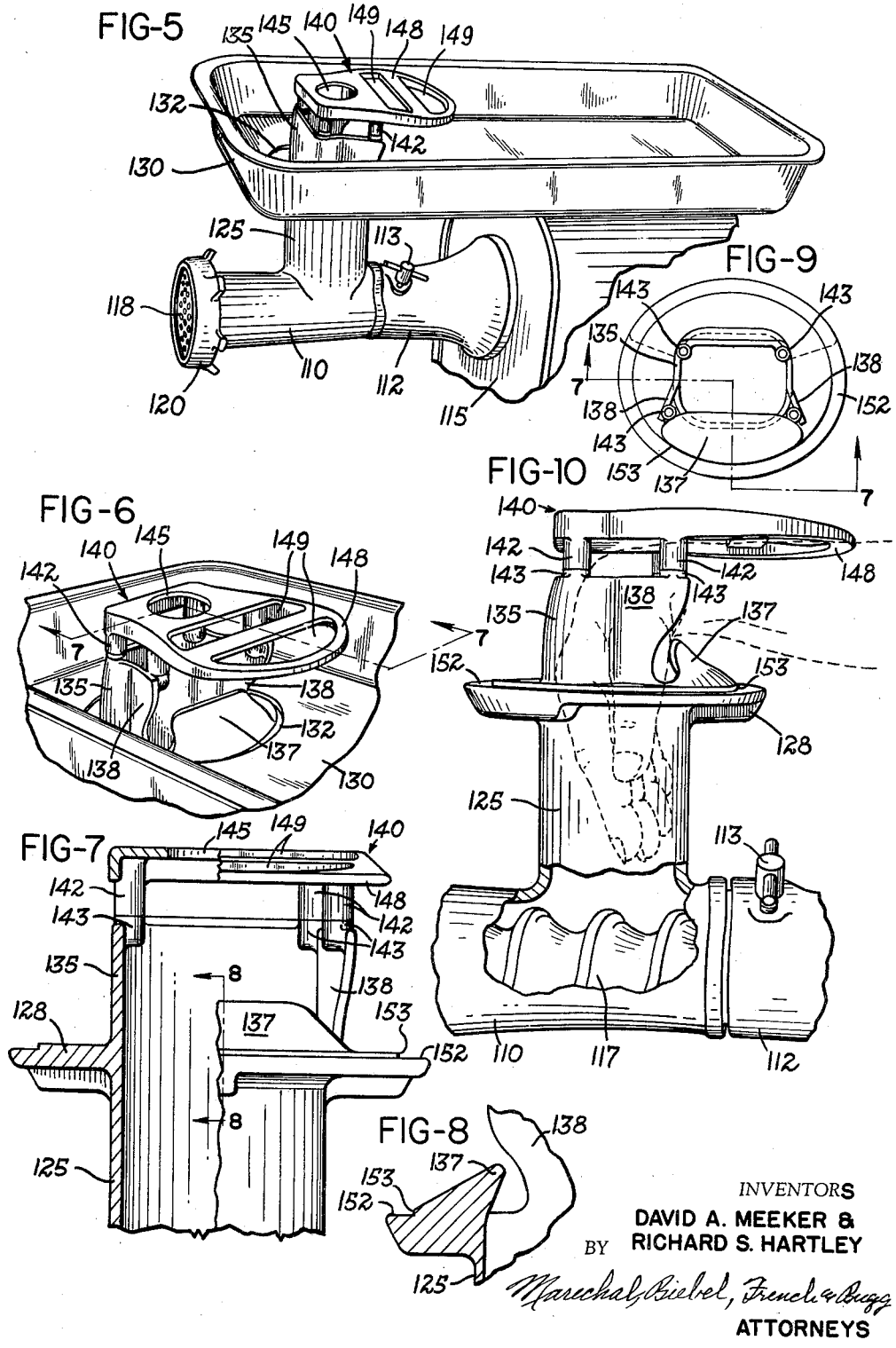

This application relates to food processing machines such as food choppers, and more particularly to protective guards for food choppers to prevent injury of the operator's hands.

Various types of protective guards and apparatus have been proposed for preventing entry of the hands of an operator into the feed cylinder of large food choppers. Generally these guards employ some type of a cover for the mouth of the chopper feed cylinder having openings therein which are small enough not to admit the hand of the operator, but through which such openings the material may be forced into the chopper. There is an advantage however in feeding larger chunks of meat and the like into the chopper, since considerable labor must be expended in cutting up the meat or other material to be chopped into pieces small enough to pass through the guard openings. Any such cutting operation involves some time and labor especially in meat processing establishments and the like where large quantities of meat may be chopped in the course of a day, and a guard construction which will absolutely protect the operator's hands and still permit large pieces to pass into the feed cylinder may be of considerable advantage in many applications.

Accordingly, the primary object of this invention is to provide a protective guard which effectively and absolutely prevents the entry of the operator's hand beyond the feed cylinder of the chopper, while providing a feed opening of sufficient area to admit relatively large chunks of meat or the like into the chopper.

Another object of this invention is to provide such a guard wherein the hand of the operator may enter the chopper feed cylinder for the purpose of pushing chunks of material into the chopping mechanism, but wherein the hand cannot touch the chopping mechanism although the cross-section of the feed cylinder remains of large capacity, sufficient to admit the hand, throughout its length.

A further object of the invention is to provide such a protective chopper arrangement wherein a pusher element may pass through the guard for the purpose of forcing material down the feed cylinder.

Another object of this invention is to provide a protective chopper arrangement of the foregoing construction wherein the chopper mechanism cannot be operated unless the protective structure is mounted in proper relation upon the chopper.

Other objects and advantages of this invention will be apparent from the following description, the accompanying drawings and the appended claims.

In the drawings:

FIG. 1 is a partial side elevational view, with certain parts broken away, of a protective chopper in accordance with the invention;

FIG. 2 is an enlarged detailed section, with certain portions in elevation, of the device shown in FIG. 1, and with a hand shown in phantom to illustrate operation of the protective feature;

FIG. 3 is a top plan view of the protective guard shown in FIGS. 1 and 2;

FIG. 4 is a wiring diagram of the protective feature;

FIGS. 5 and 6 are perspective views of a modified form of the invention;

FIG. 7 is a view partly in section and partly in elevation taken along line 7—7 of FIGS. 6 and 9;

FIG. 8 is a partial section taken along line 8—8 of FIG. 7;

FIG. 9 is a view looking down the feed cylinder with the guard removed; and

FIG. 10 is a side elevation, on an enlarged scale, of the protective chopper apparatus, with certain parts broken away and shown in section, and with a hand shown in phantom to illustrate the limiting action of the guard apparatus.

Referring to the drawings, which illustrate preferred embodiments of the invention, a chopper guard in accordance with the invention is shown in FIG. 1, and the chopper mechanism is shown generally as including a housing forming the chopper barrel or cylinder 10 secured upon a drive section 12 by conventional lock bolts 13, with the drive section in turn extending from a motor housing 15 within which is mounted a drive motor 16 (FIG. 4). This motor drives a conventional chopper feed worm 17 (FIG. 2) which in turn cooperates with the inner wall of housing 10 to force pieces of material outwardly past a knife (not shown) and through a die element 18 at the end of housing 10 in a well known manner. A suitable cap or hand wheel 20 provides a removable mounting for the die element, knife and worm in a manner well known in the art.

The inlet to chopper housing 10 is provided by an upwardly extending feed cylinder mounting neck 22 which is shown as integrally formed on housing 10, and including suitable indexing pins 23 extending from the upper surface thereof. Upon this surface rests the lower end of an upwardly extending feed cylinder 25 which is provided adjacent its upper end with an integral laterally projecting flange 28 upon which rests an elongated pan 30. The danger area 31 is, of course, at the location where the worm 17 takes the material into the barrel 10, and shears the material if the piece taken up is too large to enter in one piece. A feed opening 32 is formed in the bottom of pan 30 at one end thereof, as shown in the drawings, and the pan is located with the rim defining opening 32 registering with the feed cylinder 25 by a plurality of locating members 33 which extend downwardly along the outer edge of the flange 28.

The pan 30 is secured upon the top of housing 15 by latch members 35 which engage with brackets 36 secured to the under surface of pan 30. These latch members serve to lock the pin upon the top of feed cylinder 35, which in turn rests upon the upper surface of the feed neck 22 of housing 10, indexed in proper alignment by the pins 23. A spring biased switch operator 37 is engaged beneath a spring biased arm 38 which in turn is moved against its spring action and that of the switch operator to the position shown in FIG. 1 when the pan is properly in place. Similarly, a spring biased switch operating arm 39 extends from the front of housing 15 to be engaged by the feed cylinder 25 when the latter is locked in operative position. As will be seen from FIG. 4, the switches may be closed when the pan and feed cylinder are in operative position, permitting energization of the motor, and when these parts are removed then the motor cannot be energized by the controller since the motor circuit will be opened as the switches are individually biased open when the corresponding parts are removed.

Mounted within pan 30 is a guard 40, supported around the opening 32 by depending legs 42 which engage the surface of pan 30 and are secured thereto by screws 43 extending from below through the pan. In a preferred construction, this screw connection may be made permanently, as by deforming the screws or closing their heads such that the guard 40 may remain an integral part of pan 30 once assembled thereto.

Guard 40 is provided with a central opening 45 (FIGS.

2 and 3) which is generally aligned with the vertical axis of cylinder 25 for admitting a pusher element or the like to force material through the feed cylinder. This opening 45 is of relatively small size such that the operator cannot insert any more than a few of his fingers through this opening and partially into the upper end of the feed cylinder. Furthermore, at the sides and rear of the guard 40 there is a depending wall 46 which extends between the legs 42, and which is spaced above the lower ends of the legs such that openings between the lower edge of wall 46 and the pan surface are provided of such dimension that the operator cannot insert his entire hand therethrough, although some material may be forced through such openings.

At the forward end of guard 40 there is an outwardly extending guard portion 48 projecting transversely of the feed cylinder axis well beyond the rim provided by the edge of opening 32. This guard portion preferably extends generally parallel to the bottom of pan 30, and may include a number of small openings 49 (FIG. 3), all of which are too small to admit the hand of an operator. The guard ends in an edge 50 which is spaced above the pan by a distance $e$, signifying the entry dimension to the main feed opening.

Thus, the main feed opening to cylinder 25 is defined by opposite sides of wall 46, which terminate at the forward legs 42, at the lower end by the pan surface and the rim about opening 32, and at the top by guard 40. This feed opening extends generally at right angles to the axis of feed cylinder 25 and is of considerable size, as is apparent from inspection of FIG. 2, being sufficient to admit large chunks of meat or the like, and in fact being large enough to admit the operator's hand.

In use, the operator may actually insert his hand into the feed cylinder for the purpose of pressing material downwardly toward the chopper worm 17, but in so doing the operator is forced to flex his wrist as shown in FIG. 2. With the hand fully within cylinder 25, the length of the total feed cylinder, from the upper edge or rim at opening 32 to the area where it opens into the chopper mechanism, including the upper portion of the feed neck 22, is greater than the length of the hand from the wrist to the tip of the longest finger, which length is generally accepted as being no more than approximately (or only a fraction of an inch greater) than eight inches for virtually all persons, the adult male being considered to have the greater dimensions. When the operator's hand is in this position, his finger tips are held short of the worm 17. At the same time, the forwardly projecting portion 48 of guard 40 extends over and engages the forearm of the operator, which is of a thickness designated $a$, and prevents him from straightening his wrist, forcing the wrist to remain flexed as shown in FIG. 2, and thus preventing further entry of his hand into the feed cylinder. He can possibly move his arm forward until the back of his hand engages the front wall of feed cylinder 25, but the geometry is such that the fingers are restrained from entering the danger area 31. Thus, the under side of the inserted forearm, as shown in FIG. 2, is restrained against angular movement upward about the rim of opening 32. Obviously, then, the operator can never insert his hand so far into the feed cylinder as to cause injury to his fingers by the chopper mechanism.

Exemplary dimensions of the various parts are as follows. The total distance between the upper edge of the rim about opening 32 to the top of worm 17 is slightly greater than 9½ inches. The cross-section of feed cylinder 25 is in the nature of a flattened oval in appearance tapering somewhat from top to bottom. At the top the cross-section has a major diameter of $9^{13}/_{16}$ inches and a minor diameter of 8⅛ inches, while at the bottom the approximate dimensions are a major diameter of $6^{1}/_{16}$ inches and the minor diameter of $5^{3}/_{16}$ inches. The vertical distance between the lower side of guard 40 and the upper edge of the rim about opening 32 is 4¼ inches, while the vertical distance between the upper edge of neck 22 and the worm 17 is about $2^{5}/_{16}$ inches, part of the total 9½ inch dimension previously given. The horizontal width between the opposite legs 42, at the front of the opening as seen in FIG. 3, is approximately 16 inches, and the edge 50 is spaced horizontally rearward of rim 32 by $5^{15}/_{16}$ inches.

The advantages of the present invention are apparent when it is realized that the chopper guard construction positively prevents the insertion of the operator's fingers into engagement with the chopper mechanism, where the hand might be severely injured. The above-mentioned exemplary dimensions are such that an adult hand which is longer than average from the wrist to the tip of the longest finger cannot extend down to come into contact with the worm. Thus the wrist of an adult hand cannot be passed beyond the rim surrounding opening 32 into the feed cylinder since the extended guard portion 48 positively prevents raising the forearm above the pan surface sufficiently to straighten the wrist to lower the fingers into the worm lip. In the case of the smaller than average hand and arm, while the wrist might be forced slightly over the rim, still the length of the hand of such smaller person will be less, and the overall length of the feed cylinder, including cylinder 25 and neck 22, will still be more than sufficient to prevent contact between even the finger tips and the chopper mechanism. It has been found, therefore, that with the guard mechanism so constructed positive protection is provided for adult hands as well as for the hands of children and smaller persons, and thus it protects the hands of any operator.

The above described apparatus is particularly suitable in constructing new models of a chopping machine. However, in some instances it may be desirable to adapt the principles of this invention to choppers already in use, where the mountings for the pan and the other parts already are fixed. A suitable modified apparatus which may be used to adapt such machines in accordance with the present invention, without disturbing such mountings, is shown in FIGS. 5–10 of the drawings, wherein like parts are designated by like reference numerals in the 100 series.

The principal differences between this apparatus and that shown in FIGS. 1–3 is in the construction of the feed cylinder and mounting of the guard member. Thus, referring to FIGS. 5–10, the chopper mechanism includes a housing 110 secured upon a drive section 112 by a conventional lock bolt 113, and the drive section in turn extends from a motor housing 115 within which the drive motor (not shown) is mounted. This motor drives the chopper feed worm 117 (FIG. 10) which cooperates with the inner wall of housing 110 to force the pieces of material past a knife (not shown) and through the die element 118 which is mounted at the end of housing 110 in a well known manner, as by the removable cap or hand wheel 120.

The inlet to housing 110 is provided by an upwardly extending feed cylinder 125 which is cast integrally with the chopper housing, and which is provided adjacent its upper end with an integral laterally projecting flange 128, and upon this flange there rests the pan 130 which may also be supported in suitable manner from the motor housing 115. Portions of the feed cylinder extend through the opening 132 in the pan to provide a feed opening, and these portions include an upstanding wall 135 which preferably is formed integral with cylinder 125, and which extends vertically around the front and sides of the feed opening, while the remainder of the upper edge or rim opening includes a lip-like member 137 built up above the flange 128. The front edges of wall 135 include outwardly flared wings 138 serving to guide material into the feed cylinder.

The requisite length between the feed opening and worm 117 is provided by the built-up arrangement of the entrance rim, including the lip-like construction 137, with the distance from the end of this member to the chopper worm 117 being approximately the same as the distance between the opening 32 in FIG. 2, and the worm 17 therein.

At the top of wall 135 a guard 140 is supported by depending legs 142 which rest upon and are secured to complementary bosses 143 at the upper edge of the wall. Preferably the connection between these members is made permanent so that the guard 140 cannot be removed but remains an integral part of the feed cylinder once the assembly is made.

Guard 140 is provided with a central opening 145 generally aligned with the vertical axis of cylinder 125 for admitting a pusher element or the like. This opening is of such relatively small size that the operator cannot insert his hand fully therethrough. At the forward end of guard 140 there is an outwardly extending portion 148 which may include a number of openings 149, all of which are too small to admit the hand of an operator. This forwardly extending guard portion projects above pan 130 well beyond rim 137. Thus the feed opening to cylinder 125 is sufficiently large to admit large chunks of meat or the like, as shown particularly in FIG. 7, and in fact the operator's hand may pass therethrough.

However, in use the operator is forced to flex his wrists in the area of the lip member 137, as shown in FIG. 10 if he inserts his hand into the feed opening and the cylinder 125, and thus he is effectively prevented from forcing his hand beyond this point. The pan 130 rests upon ledge 152 at the upper surface of flange 128, with the opening 132 surrounding the shoulder 153. This ledge is of generally oval configuration, as shown particularly in FIG. 9, and is of such dimension that the guard member 140 may pass through the opening in the surface of pan 130. Therefore, if it is desired to remove the pan for cleaning or the like it is necessary only to lift the pan upward and to the right, as viewed in FIG. 1, whereby the opening 132 may be passed over guard member 140. However, the protective structure will remain in place to prevent effectively any insertion of the hand into dangerous contact with feed worm 117.

While the present invention thus positively prevents insertion even of the operator's finger tips into dangerous proximity with the chopper mechanism, at the same time the protective guard construction provides a relatively large feed opening through which large chunks of meat or other material to be chopped may be inserted, thus facilitating the use and feeding of the chopper.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a food chopper having a housing and chopper mechanism in said housing including a rotatable feed worm, a protective construction for preventing insertion of an operator's hand into a danger area of the chopper comprising a feed cylinder extending generally vertically from said housing and forming a large and essentially straight inlet to said housing, said inlet being of sufficiently large cross-sectional dimensions throughout its length to admit the full hand of an operator thus forming an unrestricted inlet for large chunks to be chopped, said cylinder including a rim portion about its upper end and also including a lower discharge end at the joint thereof with said housing forming a danger intersection where the material is forced by the worm into said housing, a pan supported on top of said rim through which material is fed from said pan to said inlet, a guard member mounted in fixed position over the entire said opening and defining a feed opening between said guard and said rim at the rear of said feed cylinder which is of sufficiently large and unrestricted size to admit large chunks of material and to pass the entire hand and wrist of the operator, said guard member extending rearward over said pan and terminating in an edge locating the entry to said feed opening rearward of said rim and spaced a predetermined distance away from said rim, said edge of said guard member extending over said pan at a predetermined distance horizontally beyond said rim which distance is related to the height of said edge above said rim in the approximate ratio of 5.9 to 4.25, the vertical length of said feed cylinder being such that said rim is spaced above said danger intersection by a distance which is greater than the length of an adult male hand from the wrist to the tip of the longest finger, said length of said feed cylinder being correctly related to said ratio with a rim-to-danger intersection dimension of nine and one-half inches, and said relation being maintained such that a decrease in said feed cylinder length dimension requires a corresponding increase in the edge-to-rim horizontal distance or a corresponding decrease in the edge-to-rim height dimension sufficient to maintain at all times a minimum predetermined angular relation of a hand inserted fully into said cylinder with respect to the connected forearm, holding the tip of the longest finger of the extended hand safely above said danger intersection.

2. In a protective food chopper as defined in claim 1, means forming a permanent connection between said guard member and said upper edge of said feed cylinder to assure protection at all times when said cylinder is assembled to said housing.

3. In a protective food chopper as defined in claim 1, means forming a permanent mounting connection between said guard and said pan, releasable mounting connections between said pan and said feed cylinder and between said feed cylinder and said housing, and a power circuit for said chopper including contacts closed only in response to proper assembly of said pan and said feed cylinder upon said housing to prevent operation of said chopper with said guard removed.

References Cited in the file of this patent

UNITED STATES PATENTS

| 1,595,836 | Gundlach | Aug. 10, 1926 |
| 1,876,471 | Sander | Sept. 6, 1932 |

FOREIGN PATENTS

| 241,693 | Germany | Dec. 11, 1911 |
| 274,335 | Great Britain | July 21, 1927 |
| 465,078 | Germany | Sept. 4, 1928 |
| 816,960 | Germany | Oct. 15, 1951 |